US011156568B2

United States Patent
Iniewski et al.

(10) Patent No.: US 11,156,568 B2
(45) Date of Patent: Oct. 26, 2021

(54) SYSTEMS AND METHODS FOR X-RAY DIFFRACTION VIRTUAL SPECTROSCOPY

(71) Applicant: REDLEN TECHNOLOGIES, INC., Saanichton (CA)

(72) Inventors: Krzysztof Iniewski, Coquitlam (CA); Michael Ayukawa, Victoria (CA); Conny Hansson, Victoria (CA)

(73) Assignee: REDLEN TECHNOLOGIES, INC, Saanichton (CA)

( * ) Notice: Subject to any disclaimer, the term of this patent is extended or adjusted under 35 U.S.C. 154(b) by 0 days.

(21) Appl. No.: 16/844,484

(22) Filed: Apr. 9, 2020

(65) Prior Publication Data
US 2020/0326290 A1    Oct. 15, 2020

Related U.S. Application Data

(60) Provisional application No. 62/833,653, filed on Apr. 13, 2019.

(51) Int. Cl.
*G01N 23/20008*    (2018.01)
*G01N 23/207*    (2018.01)

(52) U.S. Cl.
CPC ..... *G01N 23/20008* (2013.01); *G01N 23/207* (2013.01); *G01N 2223/056* (2013.01); *G01N 2223/303* (2013.01); *G01N 2223/501* (2013.01); *G01N 2223/639* (2013.01)

(58) Field of Classification Search
None
See application file for complete search history.

(56) References Cited

U.S. PATENT DOCUMENTS

| | | | |
|---|---|---|---|
| 9,847,369 B2 | 12/2017 | El-Hanany et al. | |
| 2015/0063527 A1* | 3/2015 | Daerr | G01T 1/248 378/5 |
| 2016/0240584 A1 | 8/2016 | El-Hanany et al. | |

(Continued)

OTHER PUBLICATIONS https://www.homelandsecurity-technology.com/projects/xrd-3500-explosives-detection-system/ (visited Apr. 9, 2020).

(Continued)

*Primary Examiner* — Hoon K Song
(74) *Attorney, Agent, or Firm* — The Marbury Law Group PLLC

(57) ABSTRACT

Various aspects include methods and devices for reducing the scanning time for an X-ray diffraction scanner system by increasing the count rate or efficiency of the energy discriminating X-ray detector. In a first embodiment, the count rate of the energy discriminating X-ray detector is increased by increasing the number of detectors counting X-ray scatter photon in particular energy bins by configuring individual pixel detectors within a 2-D X-ray detector array to count photons within specific energy bins. In a second embodiment, the gain of amplifier components in the detector processing circuitry is increased in order to increase the energy resolution of the detector. In a third embodiment, the individual pixel detectors within a 2-D X-ray detector array are configured to count photons within specific energy bins and the gain of amplifier components in the detector processing circuitry is increased in order to increase the energy resolution of the detector.

15 Claims, 8 Drawing Sheets

(56) References Cited

U.S. PATENT DOCUMENTS

2016/0266054 A1* 9/2016 Cao .................. A61B 6/032
2019/0339402 A1 11/2019 Crestani et al.

OTHER PUBLICATIONS

U.S. Appl. No. 16/185,963, filed Nov. 9, 2018, Redlen Technologies, Inc.
U.S. Appl. No. 16/199,588, filed Nov. 26, 2018, Redlen Technologies, Inc.
U.S. Appl. No. 16/659,096, filed Oct. 21, 2019, Redlen Technologies, Inc.

* cited by examiner

SYSTEMS AND METHODS FOR X-RAY DIFFRACTION VIRTUAL SPECTROSCOPY

FIELD

The present application relates generally to radiation detectors for X-ray diffraction virtual spectroscopy systems.

BACKGROUND

X-ray diffraction scanners are being deployed for a variety of applications in which remote detection of particular types of substances, such as explosives, is required. X-ray diffraction has been a well-established X-ray technology that relies on coherent scattering of X-ray photons, measuring the energy spectrum of scattered photons and comparing the resulting diffraction spectra or patterns to known energy spectra of the types of substances which detection is required.

X-ray diffraction has recently been deployed in advanced baggage scanning applications as such technologies enable detection on all classes of threats, such as explosives and drugs, while discriminating against benign substances, such as water. X-ray diffraction systems utilize energy dispersive diffraction technique to identify substances based on differences in the molecular structure of materials. X-ray diffraction uses an energy resolving detector array to detect photons scattered at a small fixed angle from the diffraction interaction (diffraction scattering) of X-ray photons with the inter-atom spacing of the molecules and crystals within various substances.

The diffraction scattering angle of an X-ray photon passing through a molecule depends on the wavelength (i.e., energy) of the photon and the inter-atom spacings and angles of the molecule. As different molecules and crystals have different inter-atom spacings and orientations, the diffraction scattering angles of photons passing through a scanned substance provides information about the molecules making up the substance. An energy-discriminating X-ray sensor positioned at a small angle from the line between the X-ray source and the substance being scanned will receive X-ray photons that have been diverted by diffraction scattering depending upon the molecular structure of the substance and the wavelength/energy of the photon. Counting the number of photons in a plurality of narrow energy ranges (e.g., ranges of 6 keV or narrower) across the spectrum of the X-ray source provides a measure of the energy spectrum of the photons that have been diffraction scattered by the substance. This photon diffraction scattered spectrum can then be compared to the known diffraction scattered spectra of various substances, particularly to substances for which detection is most desired. A high degree of correlation or matching between the detected photon diffraction scattered spectrum and a particular known photon diffraction scattered spectrum will indicate that some amount of the corresponding substance or molecules is present in the scanned substance.

While X-ray diffraction systems have great potential for detecting particular substances within a scanned object (e.g., luggage), the current technology suffers from low throughput. This is because existing energy resolving detectors require several seconds of exposure to X-rays in order to capture sufficient photon counts to provide the necessary statistics to measure the energy spectrum with sufficient energy resolution.

SUMMARY

Various aspects of the present disclosure provide methods of improving the speed and accuracy for measuring the energy spectrum of scattered X-ray photons in an X-ray diffraction system. In one embodiment, a method for performing X-ray diffraction scanning of an object includes measuring radiation energy spectra by a 2-D X-ray detector array in which a plurality of individual pixel detectors are configured to count photons within set energy bins, and generating an energy spectrum based on the photon counts received from the plurality of individual pixel detectors. In another embodiment, a detector for use in an X-ray diffraction scanner system includes a 2-D X-ray detector array in which a plurality of individual pixel detectors are configured to count photons within set energy bins.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1A:
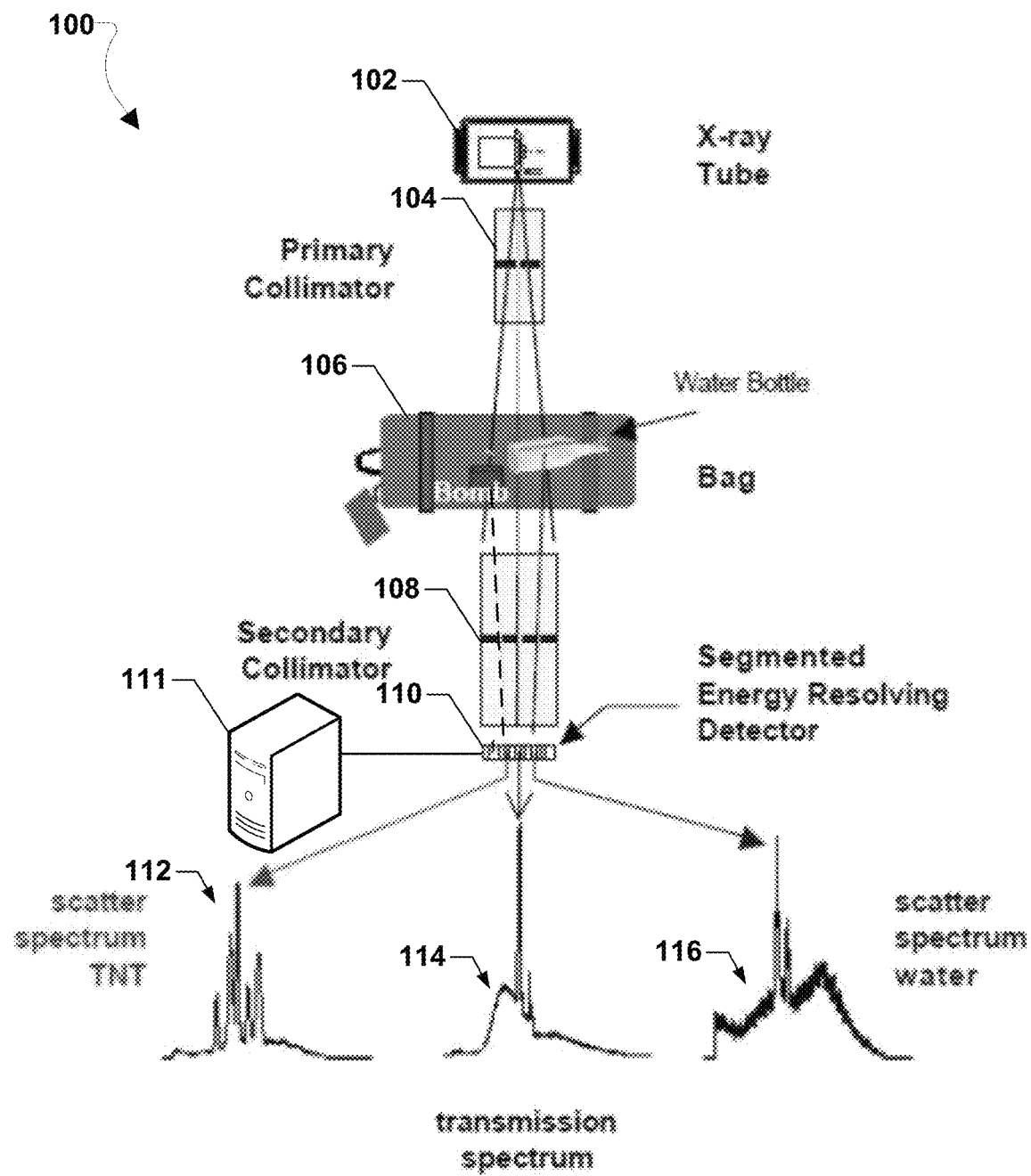
FIGS. 1A and 1B are a block diagrams of a typical X-ray diffraction scanner system suitable for use with various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Various embodiments of the present disclosure include devices and methods for resolving the spectrum of scattered X-ray photons diffracted by the molecular structures of substances within a scanned object using X-ray diffraction technologies.

The main limitation on the throughput of conventional X-ray diffraction scanners is the technical limits of the energy discriminating X-ray detectors. To work properly, X-ray diffraction scanners requires superior detection, and energy resolution (ER) needs to be very good, better than 5 keV per energy bin. Further, there needs to be a large number of such narrow energy-width bins to provide a detect an energy spectrum spanning the full range of energies that can be expected from diffraction of X-rays by the various substances that may be encountered and particularly the substances for which detection or discrimination is most important.

Energy discriminating X-ray detectors operate by measuring currents induced in the detector by absorbed X-rays, and which is directly related to the energy of the absorbed X-ray. The measured current from each count is assigned to a particular range of energies, referred to as "bins" which correspond to a range of X-ray energies. The narrower the range of X-ray energies in each been, the greater the energy resolution of the detector. The detector circuitry then counts the number of X-ray photon absorptions with measured currents that fall into each of the bins. Correlating measured currents to X-ray energies, one or more accurately to X-ray energy bins, is achieved by calibrating the detector with X-ray sources having a known spectrum. After sufficient counts have been recorded in each energy bin, the resulting counts per bin energy yields a spectrum of the observed X-rays.

Conventionally, superior detection of substances based on the generated spectra of diffracted X-rays is achieved in spectroscopic detectors by limiting the photon flux incident on the detectors, which results in a low count rate by the detector. This is because current energy discriminating X-ray detectors configured to have precise energy resolution operate with a photon count rates of less than 10 thousand counts per second per square millimeter of detector (kcps/mm2), and frequently much less than that, in order to avoid saturation. Thus, there is a tradeoff in energy resolution; the more precise the energy resolution, the lower the count rate that can be sustained to avoid saturating the detector. Exposing energy discriminating X-ray detectors to higher photon count rates will result in multiple X-ray absorptions being process as a single count of an energy equal to the sum of the energies of the X-ray photons absorbed approximately simultaneously. Limiting the X-ray flux to maintain the detector count rate to 10 kcps/mm2 or less requires long scanning times in order to achieve the necessary number of counts for good statistics, which is typically 2000 counts or more per energy bin. Consequently, conventional X-ray diffraction scanners have a low throughput.

High flux and thus high count rate X-ray detectors exist, as are used in computed tomography (CT) scanners for example. However, detectors configured to operate with high count rates have very limited spectroscopic capabilities, i.e., a limited number of energy bins. Thus, the energy resolution of high-flux (i.e., high count rate) X-ray detectors is limited, typically 8-10 keV. This is acceptable for imaging applications, like CT scanners and direct X-ray imagers. However, the energy resolution for high-flux detectors is insufficient for X-ray diffraction scanners, because the spectrum characteristics of many substances of interest cannot be resolved.

Another limitation is that photon counting application specific integrated circuits (ASICs) have a limited number of energy bins available; from 1 to 8 typically. For example, in a spectral CT scanner 2-4 bins are typically used. Implementing a higher number of bins consumes power and real estate as there needs to be many comparators, digital logic, IO circuitry, etc. Therefore, such approaches are rarely implemented.

Therefore, to improve the performance of X-ray diffraction scanners, two problems need to be solved together; generating more energy bins while lowering the energy resolution to an acceptable level.

Various embodiments provide two ways to improve the throughput of X-ray diffraction scanners that can be employed independently or in combination. In a first embodiment, the number of bins is increased by using a larger number of pixel detectors within an array of solid-state X-ray detectors to provide greater energy resolution. In a second embodiment, the detector is configured to have a higher gain.

X-ray diffraction scanning can exploit a large number of energy bins to provide finer resolution of the diffracted X-ray spectrum. By increasing the number of energy bins in energy discriminating X-ray detectors from six to twelve, as is common in conventional X-ray diffraction scanners, to significantly more, such as up to 144 bins in some embodiments, the number of photon counts per unit time spanning the energy spectrum can be increased.

In the first embodiment, a two-dimension (2-D) X-ray detector array of pixel detectors is used to provide up to twenty-four times (24×) as many bins as in 1-D X-ray detectors which commonly include just 6 bins. In general, using a (2-D) X-ray pixel detector array, the total number of energy bins is N×M, where N is the number of rows of pixel detectors and M is the number of threshold counters in the detector. To leverage the additional X-ray detectors in the detector array, each row (or column, depending on orientation) may be configured for different energy bins. To enable this, the photon counting ASIC may be configurable on a per channel (i.e., per individual detector) basis. CMOS technologies are reducing the cost per channels, thus making this embodiment cost effective.

The first embodiment may be implemented using a solid-state detector array, such as a cadmium-zinc-telluride (CZT) detector. An example of such a detector is configured on a crystal of $Cd_{0.9}Zn_{0.1}Te$. Another example of detector material is a germanium crystal detector. Other types of semiconductor detector materials may be used in the energy discriminating detectors.

In the first embodiment, each pixel row 2-D X-ray detector array of pixel detectors is assigned different energy bins. In an example embodiment, a first row may comprise pixel detectors connected to the photon counting ASIC that is configured to provide energy bins of 20 keV, 40 keV, 60 keV, 80 keV, 100 keV, 120 keV, etc., while a second row of pixel detectors connected to the photon counting ASIC that is configured to provide energy bins of 21 keV, 42 keV, 61 keV, 81 keV, 101 keV, 121 keV, etc. In this example embodiment, the detector circuitry (including the photon counting ASIC) may be configured such that each row of pixel detectors spanning the 2-D X-ray detector array is incremented by an amount of photon energy desired (delta-energy per row), such as 1 KeV, 2 keV, 4 keV, etc. In other words, the photon counting ASIC may be configured so that the thresholds for the energy bin of each pixel detector within the 2-D detector array are individually adjusted to provide the 6-12 energy bins within a row (or column) and incremented energy bins in each row (or column). In some embodiments, top and bottom rows may be skipped (i.e., not used for measuring the diffraction photon energy spectrum) as such pixel detectors may exhibit poor quality edges that can impact accuracy and/or energy resolution in those bins.

In the first embodiment, with N rows of pixel detectors in the detector array and 6 energy bins per channel the total number of bins is N×6 bins. For example, with an X-ray detector array with 24 rows of detector pixels (i.e., N=24), the detector assembly can have 144 energy bins if all rows are used, or 132 energy bins if top and bottom edge rows are not used.

Using 2-D pixel detectors for X-ray diffraction may involve careful calibration as each pixel detector may require calibration as the pixels are not necessarily identical (i.e., may exhibit different signal responses to absorption of X-ray photons). Thus, the first embodiment includes performing pixel-by-pixel calibrations using the same X-ray source scanning calibration targets with known diffraction spectra and adjusting the calibration factor for each pixel detector so that the recorded photon counts for each pixel in its respective energy bin matches the corresponding spectrum photon counts.

The second embodiment involves improving the energy resolution of the detector by increasing the gain of one or more amplifiers. While increasing the gain in the detector may lower the energy dynamic range of the detector, this effect is acceptable for X-ray diffraction scanners because the energy dynamic range of photons of interest (i.e., diffraction scattered photons) is lower than the photon energy used in CT imaging systems, for example. The coherent scatter signal (i.e., photons scattered due to molecular diffraction) is in 20-80 keV range.

Photon counting detectors contain multiple amplifiers in the signal detection paths. A first amplifier is typically called the Charge-Sensitive Amplifier (CSA). This amplifier integrates the charge of each X-ray photon detection sensor (e.g., a germanium pixel sensor). A second amplifier is typically called the Shaping Amplifier (SHP), which "shapes" or filters the Charge-Sensitive Amplifier output and provides additional amplification. The Shaping Amplifier is sometimes referred to as a high-pass filter, or band-pass filter.

The second embodiment leverages the phenomena that the input referred noise can be minimized by increasing the Charge-Sensitive Amplifier gain. This is reflected in the following formula, which is adopted from wireless communication technologies:

$$\text{Total Input Referred Noise} = \text{Noise}_{CSA} + \text{Noise}_{SHP}/\text{Gain},$$

where $\text{Noise}_{CSA}$ is the noise of the Charge-Sensitive Amplifier, $\text{Noise}_{SHP}$ is the noise of the Shaping Amplifier, and Gain is the gain of the Charge-Sensitive Amplifier.

Typically, $\text{Noise}_{CSA}$ is 60% of the total noise so by increasing the gain by a factor of 2 the overall noise of the detector can be reduced by 20% by reducing contribution from the Shaping Amplifier (i.e., the shaper component of the amplifiers).

The second embodiment enables X-ray detector arrays normally used for CT scanners and other imaging systems (e.g., CZT detector arrays) to be use for X-ray diffraction scanners by changing the gain modes. The gain modes can be adjusted by changing the capacitance of the feedback capacitor (Cfb) in the Charge-Sensitive Amplifier. Doing so results in a lower energy dynamic range of the X-ray detector system but improved energy resolution, exactly what is needed for X-ray diffraction scanners. For example, by changing the capacitance of the feedback capacitor (Cfb) from 13 fF (femto-Faradays) to 11 fF, X-ray detectors that are normally configured for use in CT imaging systems with an energy resolution of 7.5 keV and an energy dynamic range of 190 keV (the default mode for CT) can operate with an energy resolution of 5.7 keV and an energy dynamic range of 150 keV, which is suitable for X-ray diffraction scanners. Thus, while changing the feedback capacitor renders the detectors unsuitable for CT imaging, which requires a 190 keV energy dynamic range, the detectors are ideal for X-ray diffraction scanners. Thus, the same basic X-ray detector system (e.g., using CZT detectors) can be used for either CT scanners or X-ray diffraction scanners by configuring the X-ray detector system to operate in a low gain mode (suitable for CT scanners) or a high gain mode (suitable for X-ray diffraction scanners).

The second embodiment may be extended by also providing a very high gain mode, which would further improve the energy resolution while further lowering the energy dynamic range. For example, by further increasing the Charge-Sensitive Amplifier gain in a very high gain mode, an energy resolution of 4.8 keV may be achieved with a dynamic energy range of 120 keV.

A third embodiment combines the 2-D detector configured to provide a large number of energy bins with increasing the gain of the detector amplifiers. This third embodiment leverages the large number of energy bins that can be created using a detector with a 2-D array of pixel detectors so that spare rows (or columns) can be used for incremented energy bins. Additionally, the third embodiment uses detector circuitry that permits configurable amplifier gain to improve energy resolution (i.e., reduce the range within each energy bin).

The various embodiments are expected to enable virtual X-ray diffraction scanning at a rate that is up to 100× faster than conventional X-ray diffraction scanning.

Figure 1B:
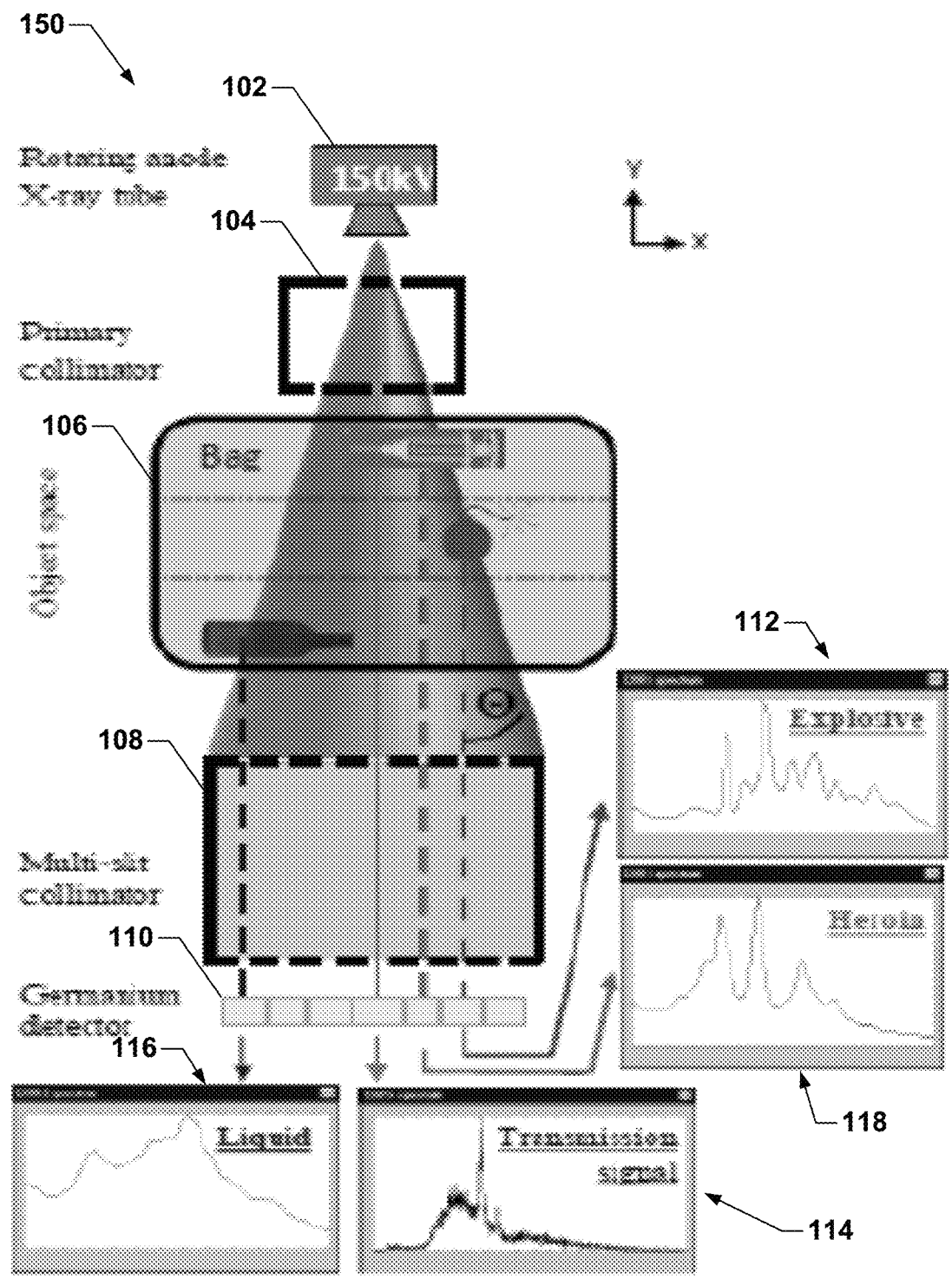

FIGS. 1A and 1B are block diagrams of an example X-ray diffraction scanner system 100. Referring to both FIGS. 1A and 1B, an X-ray diffraction scanner system 100 may include an X-ray source 102 positioned to emit X-rays through a primary collimator 104 and onto an object being scanned 106, such as baggage. X-rays passing through the scanned object 106 (i.e., X-rays that are not of the absorbed) passed through a secondary collimator 108 and then onto a segmented energy resolving detector 110. As mentioned above, the energy resolving detector 110 may be a plurality of 2-D energy resolving detector arrays made up of a plurality of detector pixels as described herein. The 2-D energy resolving detector arrays may be pixilated CZT detector arrays. Signals from the energy resolving detector 110 may be processed by processing equipment 111 that receives photon counts in each of the plurality of energy bins and uses this information to generate scatter photon spectrums. The processing equipment 111 may further compare the generated scatter spectrums to known spectrums of particular substances for which detection is desired, such as explosives, drugs, and known benign substances such as water.

X-rays passing through the scanned object 106 interact with substances within the object either being absorbed or scattered by atoms and molecules within the substances. Absorption of X-ray photons is the operating mechanism for imaging X-ray systems. However, in an X-ray diffraction scanner system 100 the X-rays of interest are those that are scattered via diffraction by molecules within the substance. As illustrated in the figures, X-rays that are not absorbed or diffracted pass through the scanned object 106 and directly onto the detector 110 without changes to the spectrum of the X-rays emitted from the X-ray source 102, resulting in measurements of the transmission spectrum 114. X-rays that are scattered due to diffraction by substances within the scanned object 106 (e.g., water or explosives) may be detected on individual detector arrays within the detector assembling 110 that are a distance away from the centerline of the X-ray diffraction scanner, as such X-rays are scattered through a small angle due to diffraction. As noted above, the angle of diffraction of X-rays varies based on the wavelength of the photons and the molecular structures of the various substances, which results in a scatter energy spectrum that can be recognized. For example, X-ray photons scattered by TNT within the bomb illustrated in FIG. 1A will exhibit a scatter spectrum 112 that is unique and different from that of the transmission spectrum 114 and the scatter spectrum of other substances such as the scatter spectrum of water 116.

An X-ray diffraction scanner system 100 may include other structures and systems not illustrated in FIGS. 1A and 1B. For example, in industrial applications, such as luggage screening, the X-ray source 102 may be positioned on a far side of the object being scanned with respect to the X-ray energy resolving detector array and the X-ray photons imaged by the detector 110 may be photons that have passed through the object instead of being emitted from the object. In such applications, both the X-ray source 102 and the X-ray energy resolving detector array 110 may be rotated about the object, such as on a rotating frame or gantry. Further, an X-ray diffraction scanning system 100 may include positioning equipment for locating objects to be scanned (e.g., luggage) within the scanner, such as conveyor belts, robotic arms, etc., as well as control systems for controlling the movements of objects and coordination of scanning operations.

The detector 110 of an X-ray diffraction scanner system may include an array of radiation detector elements. According to various embodiments, such radiation detectors include 2-D X-ray detection arrays made up of a plurality of individual detector elements, which in some embodiments may comprise a CZT crystal. Individual detector elements within a 2-D X-ray detector array are referred to herein as pixel detectors. The signals from the pixel sensors may be processed by a pixel detector circuit, such as in analyzer equipment 111. The analyzer equipment 111 may sort detected photons into energy bins based on the energy of each photon or the voltage generated in the pixel detector by the received photon. When an X-ray photon is detected, its energy is determined and the photon count for its associated energy bin is incremented. For example, if the detected energy of a photon is 62 kilo-electron-volts (keV), the photon counts for the 5-6 keV energy bin centered around 60 keV may be incremented. Various embodiments provide radiation detectors that feature a large number of energy bins, such as up 144. The greater the total number of energy bins, the better the energy spectrum discrimination. There may be a large number of detector arrays within an X-ray diffraction scanner 100. Thus, the X-ray energy resolving detectors 110 can provide information regarding both the location (within particular detectors) of X-ray photon detections and the energy of the detected X-ray photons within the energy bins represented by individual pixel detectors within the detector arrays.

Figure 2:
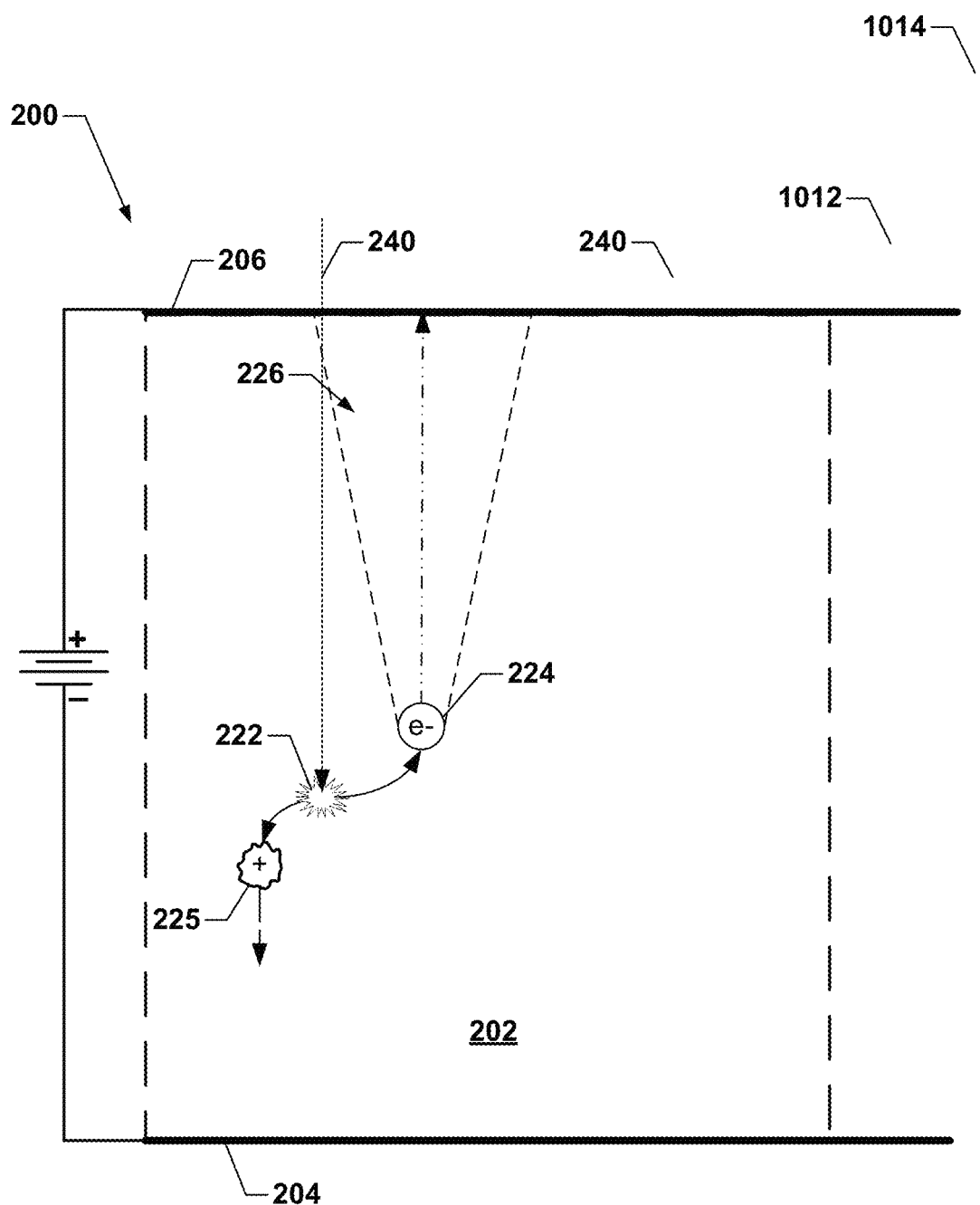
FIG. 2 is a cross-sectional representation of a solid-state X-ray detector pixel illustrating detection mechanisms for an X-ray photon.

FIG. 2 illustrates a cross-sectional view of a pixel detector 200 within a 2-D solid-state radiation detector array 200. Various materials may be used for solid-state radiation detectors, including CZT semiconductor crystals. As an example, a detector 200 may include a sheet of CZT semiconductor crystal 208 on which are applied to a cathode 204 and anodes 206 that define each pixel 202. The anodes 206 may be spaced apart to create individual pixel detectors (one of which is illustrated). In typical radiation detector arrays 200, the thickness of the CZT semiconductor crystal 208 may range from 1 mm to 20 mm, the anodes 206 may have a side dimension of 0.1 mm to 3 mm, and the inter-pixel gap 210 may range from 0.01 mm to 0.5 mm.

When an X-ray-ray 220 is absorbed 222 by an atom within the CZT semiconductor crystal 208, a cloud of electrons 224 are ejected into the conduction band of the semiconductor. Each ejected electron 224 creates a corresponding hole 225 of positive charge. A voltage is applied between the cathode 204 and anodes 206 causes the electrons 224 to drift to the anode 206 where they are collected as a signal as described above. Diffusion and charge repulsion forces cause the electron cloud to expand (as shown at 226) by the time the electrons reached the anode 206a. Holes 225 similarly migrate towards the cathode 204.

Figure 3:
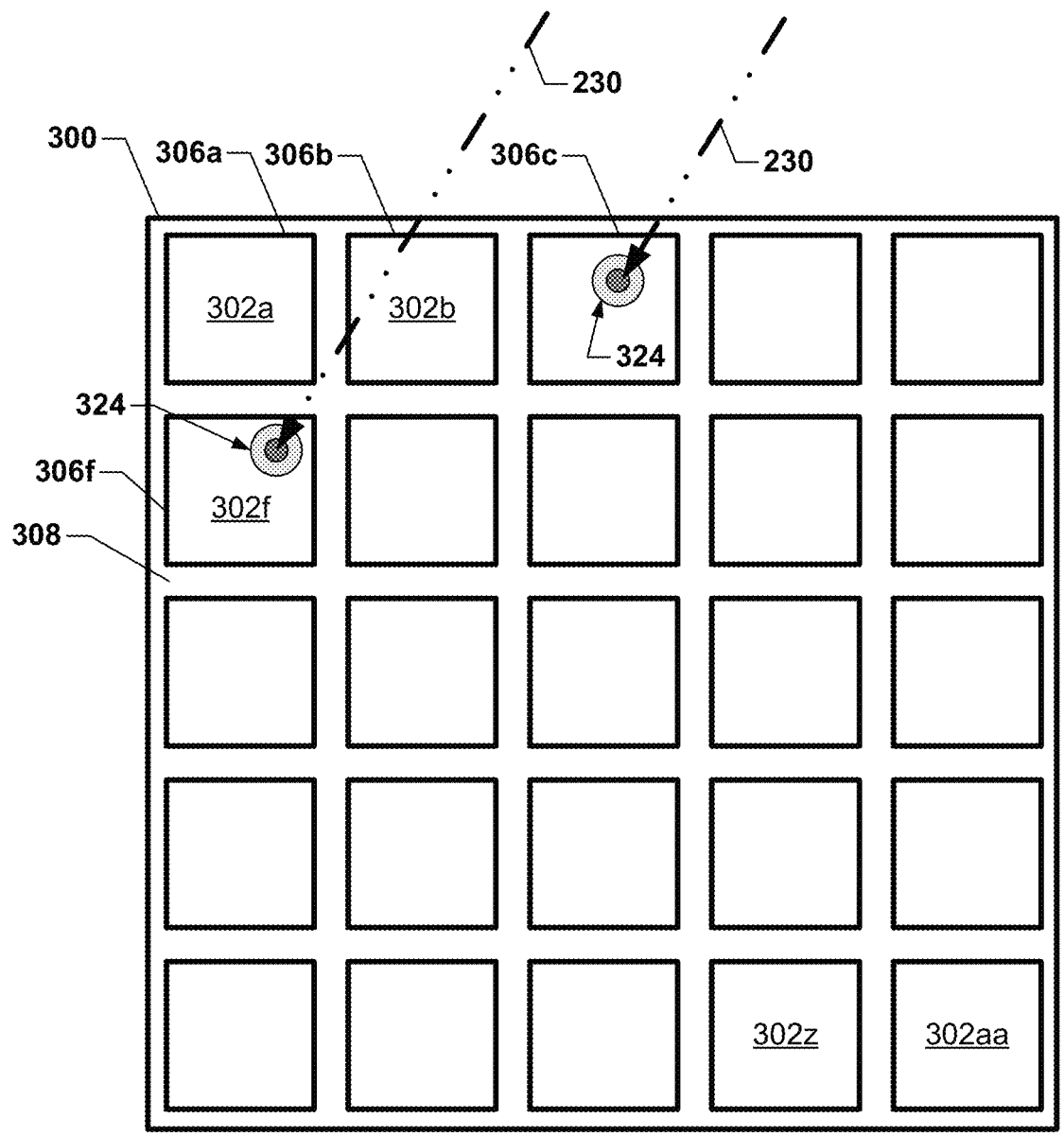
FIG. 3 is a conceptual top view diagram of a portion of a semiconductor pixel radiation detector illustrating X-ray interactions.

FIG. 3 is a top view of a portion of a pixelated radiation detector array 200 showing the plurality of pixels 202a-202aa formed by the anodes 206 positioned on the CZT semiconductor crystal 208. As described above, when an X-ray-ray 220 interacts with atoms within the CZT semiconductor crystal 208, the ejected electrons 224 are gathered on the nearby anode 206c, 206f and recorded as a count by attached circuitry, such as a photon count ASIC. Further, the number of electrons 224 (i.e., charge) collected on the anode 206c, 206f is reflective of the energy of the incoming photon, and thus a measurement of the energy (or spectrum) of the detected photon can be determined from the charge or current detected on the anodes.

X-ray-ray photons can interact with the detector material (e.g., CZT or germanium) in various ways. The photons may be completely removed from the incident photon beam by absorption, may be scattered after the interaction, or may pass through the detector without any deterioration of their energy. At low energies of interests, such as 20-150 keV, and typical sensor thickness of 5 mm, most of the incoming radiation photons are either absorbed or pass through the detector.

Figure 4A:
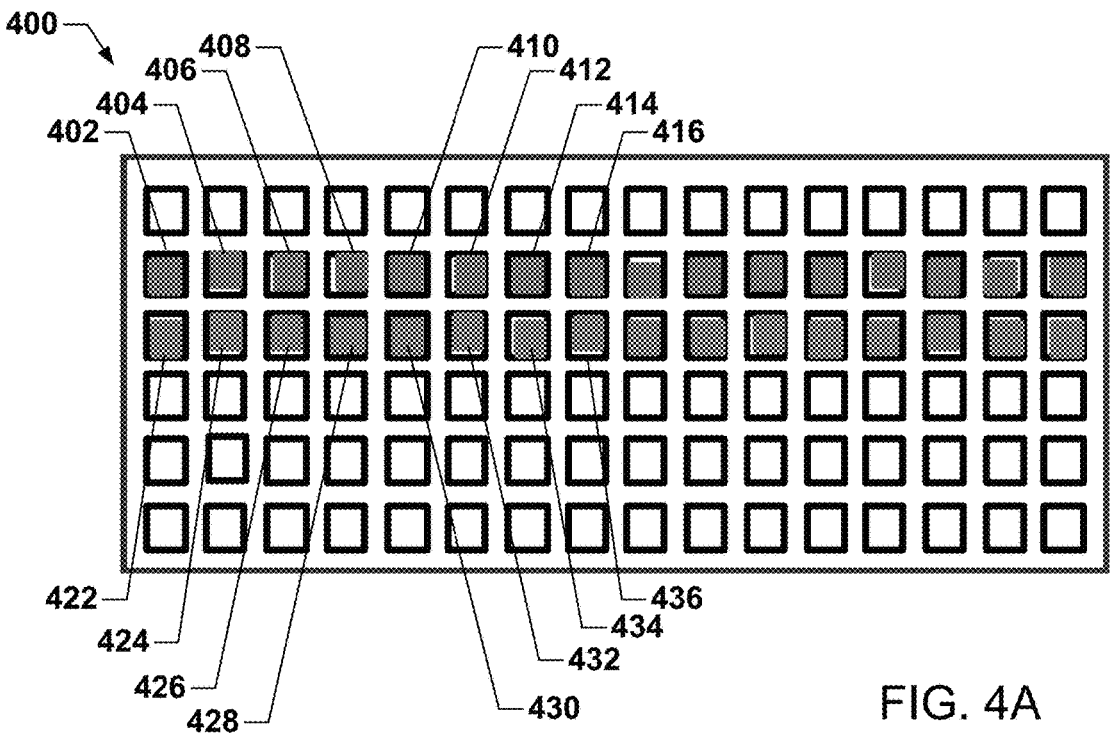
FIGS. 4A-4B are top views of example two-dimensional (2-D) solid state X-ray detector arrays configured according to an embodiment.

In a first embodiment, multi-pixel X-ray detector arrays are configured to provide a large number of bins for detecting X-ray photons within narrow energy bands (5-6 keV). An example of this is illustrated in FIG. 4 which shows detector 400 that includes a 6 by 16 array of detector pixels organized in rows and columns. In the example detector array 400 illustrated in FIG. 4A, the second and third rows are configured (e.g., by a photon counting ASIC) to provide photon counts in particular energy bins. For example, in the second row of pixel detectors, pixel detector 402 may be configured to provide counts within an energy bin centered about 20 keV, pixel detector 404 may be configured to provide counts within an energy bin centered about 40 keV, pixel detector 406 may be configured to provide counts within an energy bin centered about 60 keV, pixel detector 408 may be configured to provide counts within an energy bin centered about 80 keV, pixel detector 410 may be configured to provide counts within an energy bin centered about 100 keV, pixel detector 411 may be configured to provide counts within an energy bin centered about 120 keV, etc. A similar pattern may be implemented in the next row of pixel detectors. Using the example of incrementing energy bins by 1 keV between rows, in the third row of pixel detectors, pixel detector 422 may be configured to provide counts within an energy bin centered about 21 keV, pixel detector 424 may be configured to provide counts within an energy bin centered about 41 keV, pixel detector 426 may be configured to provide counts within an energy bin centered about 61 keV, pixel detector 428 may be configured to provide counts within an energy bin centered about 81 keV, pixel detector 430 may be configured to provide counts within an energy bin centered about 101 keV, pixel detector 431 may be configured to provide counts within an energy bin centered about 121 keV, etc.

Figure 4B:
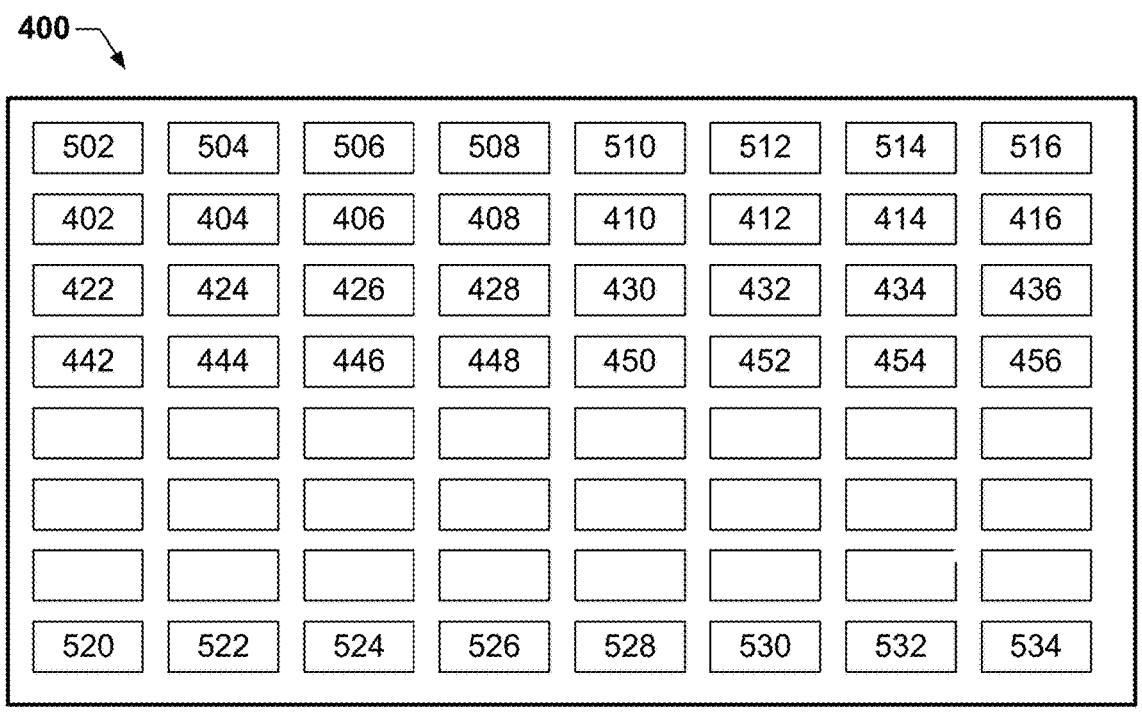

FIG. 4B illustrates that more than two rows of pixel detectors within a detector array may be used for determining the spectrum of X-ray photons. In the example illustrated in FIG. 4B, the first role of pixels (i.e., pixels 502-516) and a last row of pixels (i.e., pixels 520-534) may not be used for detecting photons due to the fact that edge rows may have lower sensitivity or higher noise than the rest of the pixel detectors in the array. Using the example of incrementing the energy bins by two keV per row, pixel detectors 402-416 may be configured (e.g., by a photon counting ASIC) to provide photon counts for energy bins centered around 20 keV, 40 keV, 60 keV, 80 keV, 100 keV, 120 keV, etc., respectively; pixel detectors 422-436 may be configured (e.g., by a photon counting ASIC) to provide photon counts for energy bins centered around 22 keV, 42 keV, 62 keV, 82 keV, 102 keV, 122 keV, etc., respectively; and pixel detectors 442-456 may be configured (e.g., by a photon counting ASIC) to provide photon counts for energy bins centered around 24 keV, 44 keV, 64 keV, 84 keV, 104 keV, 124 keV, etc., respectively. In this manner, a large number of energy bins can be supported by a single detector array, thereby providing greater spectral coverage and providing more detectors within a given range of energies or bins for collecting photon counts. Increasing the number of detectors sensitive to photons in a given energy bin may enable collecting the statistical minimum number of counts to determine an energy spectrum within a shorter amount of time than if only a single detector is used for each energy bin.

Figure 5:
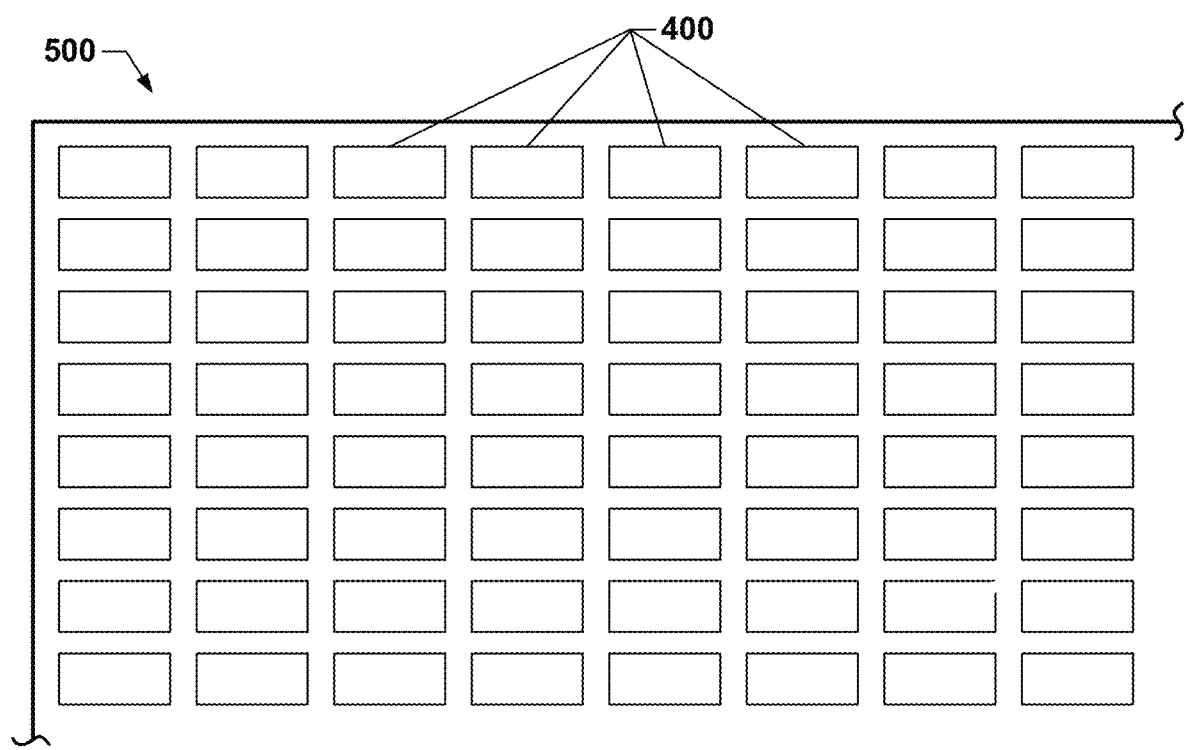
FIG. 5 is a diagram of how multiple 2-D X-ray detectors may be implemented in an X-ray diffraction scanner.

In an X-ray diffraction scanner system, multiple detector arrays 400 may be used in a macro array 500 as illustrated FIG. 5. Using an array 500 of multiple detector arrays 400 may enable the scanner system to both detect particular substances (e.g., explosives, drugs, etc.) based on scatter spectrum data gathered by each detector array 400, as well as obtain information regarding the location of such substances within the scanned object based on the particular detector array from which the matched scatter spectrum was generated.

Figure 6:
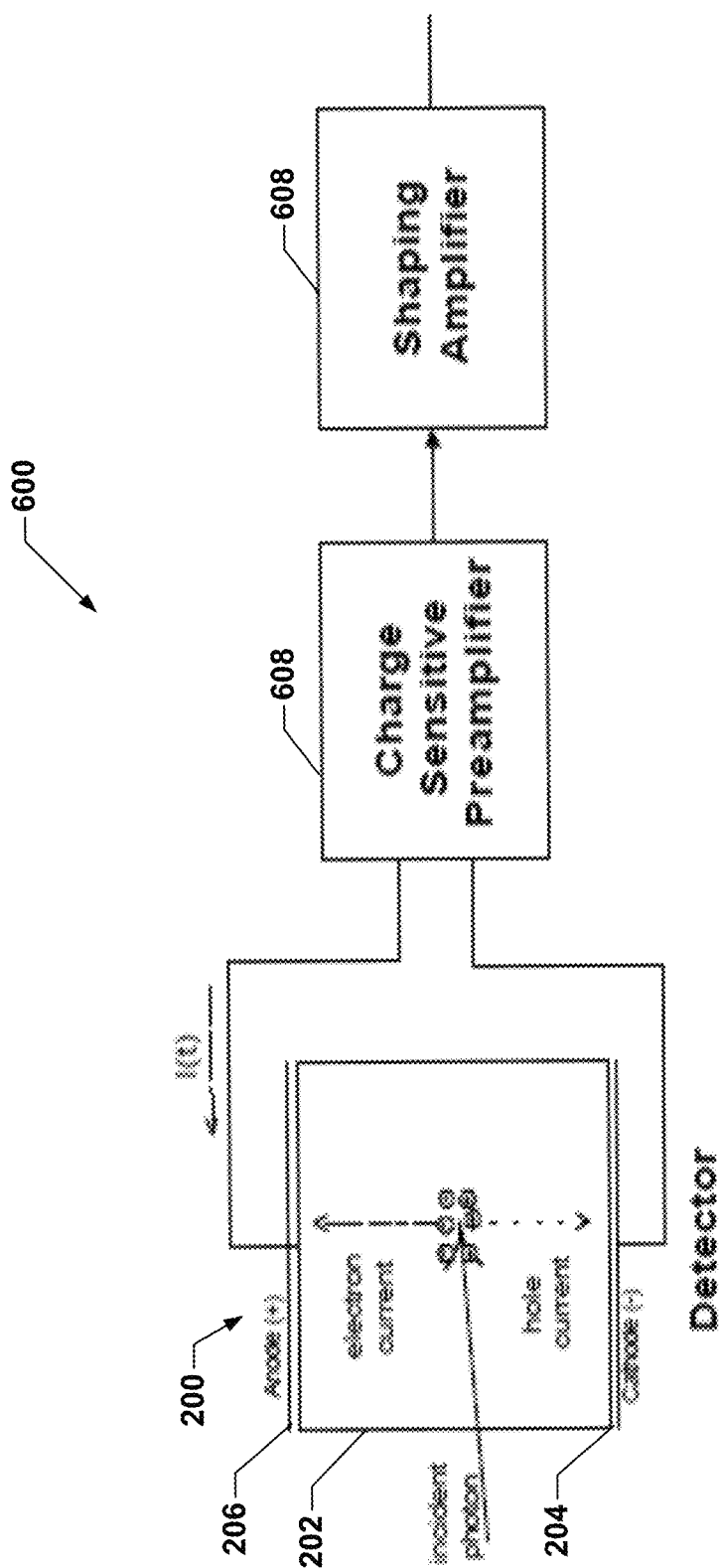
FIG. 6 is a diagram of an X-ray detector pixel and the amplifier components according to an embodiment.

FIG. 6 illustrates the amplifier components of processing circuitry that are part of the detector device according to embodiments. In particular, FIG. 6 illustrates a single pixel detector 200 (as described with reference to FIG. 2) coupled to a Charge-Sensitive Amplifier 608 which is configured to output an amplified signal to a Shaping Amplifier 608, which provides charge signals to circuitry that may determine the energy of the detected photon and count detected photons within energy bins. As described above, in the second embodiment, the gain of the Charge-Sensitive Amplifier 608 may be increased in order to reduce the total input noise of the detector based on the formula:

Total Input Referred Noise=$Noise_{CSA}$+$Noise_{SHP}$/Gain.

As described above, the second embodiment enables X-ray detector arrays normally used for CT scanners and other imaging systems to be use for X-ray diffraction scanners by changing the gain modes. The gain modes can be adjusted by changing the capacitance of the feedback capacitor (Cfb) in the Charge-Sensitive Amplifier. Doing so results in a lower energy dynamic range of the X-ray detector system but improved energy resolution, exactly what is needed for X-ray diffraction scanners. For example, by changing the capacitance of the feedback capacitor (Cfb) from 13 fF to 11 fF, X-ray detectors that are normally configured for use in CT imaging systems with an energy resolution of 7.5 keV and an energy dynamic range of 190 keV (the default mode for CT) can operate with an energy resolution of 5.7 keV and an energy dynamic range of 150 keV, which is suitable for X-ray diffraction scanners. Thus, while changing the feedback capacitor renders the detectors unsuitable for CT imaging, which requires a 190 keV energy dynamic range, the detectors are ideal for X-ray diffraction scanners. Thus, the same basic X-ray detector system can be used for either CT scanners or X-ray diffraction scanners by configuring the X-ray detector system to operate in a low gain mode (suitable for CT scanners) or a high gain mode (suitable for X-ray diffraction scanners).

Figure 7:
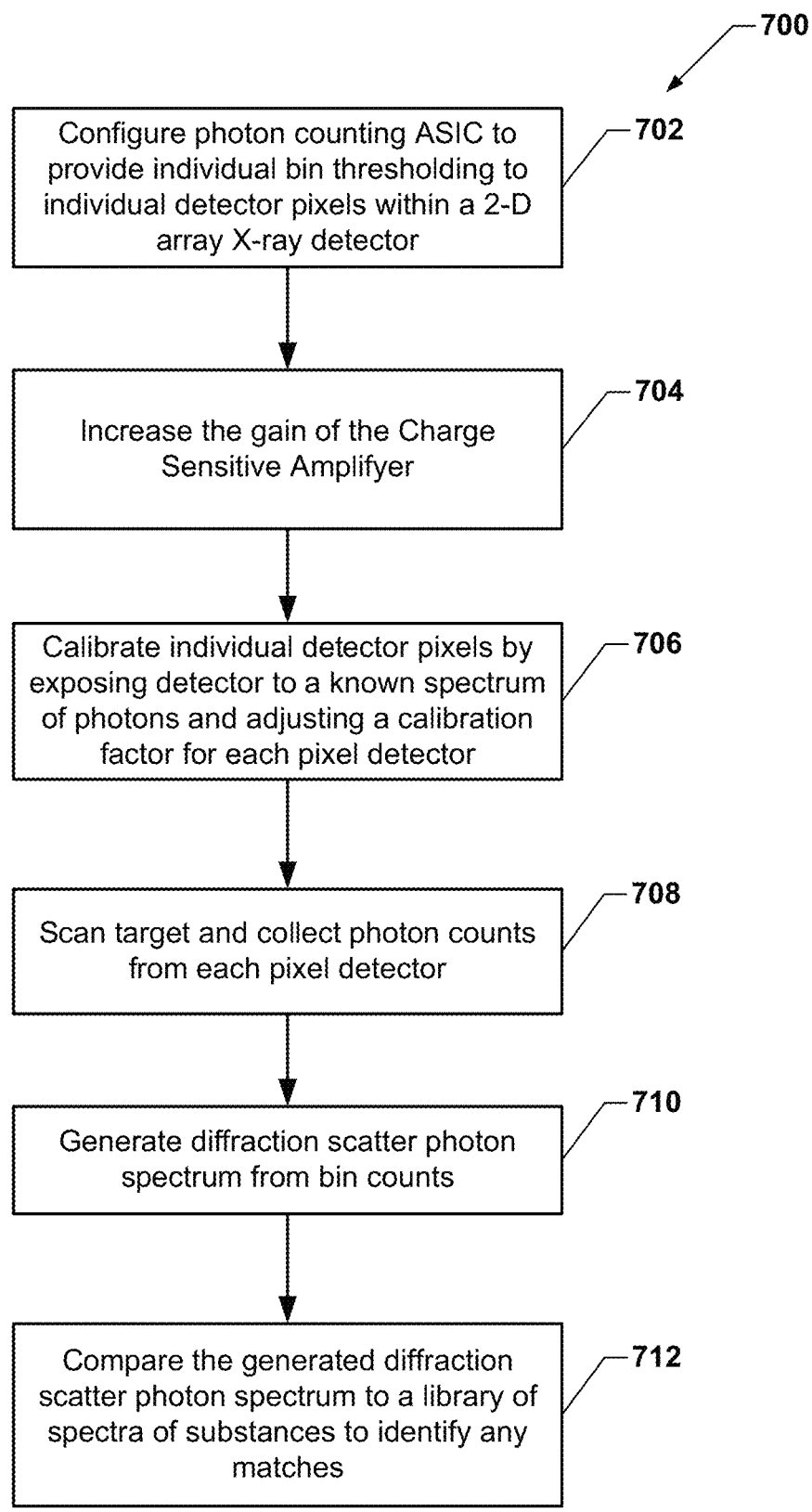
FIG. 7 is a process flow diagram of a method of conducting X-ray diffraction scanning according to an embodiment.

FIG. 7 illustrates a method 700 for conducting X-ray diffraction scanning according to various embodiments. The method 700 may be implemented in part by a processor of a computing device, such as the processing equipment 111 illustrated in FIG. 1A, as part of an X-ray diffraction scanning system 100.

In step 702, a photon counting ASIC coupled to a 2-D X-ray detector array may be configured to provide individual energy bin thresholding for individual detector pixels as described herein.

In step 704, the amplifier gain of the Charge-Sensitive Amplifier may be increased to an amount suitable for X-ray diffraction scanning if not already at such gain.

In step 706, the individual detector pixels of the various 2-D X-ray detector arrays within the X-ray diffraction scanning system may be calibrated, such as by exposing the detectors to a known spectrum of X-ray photons and adjusting a calibration factor for each pixel detector so that the measured count approximately equals the count that is appropriate for the known spectrum. Such calibration should be performed on individual pixels basis because the sensitivity of each pixel within a detector array may vary.

In step 708, scanning of an object may be performed by scanning the target with X-rays and collecting photon counts from each pixel detector corresponding to each detector's energy bin.

In step 710, the processing equipment may generate a diffraction scatter photon spectrum based upon the bin counts received in step 708. This operation may be performed for each of the 2-D X-ray detector arrays within the X-ray diffraction scanner system, thereby providing both spectral and positional information.

In step 712, the generated diffraction scatter photon spectrum may be compared to spectra within a library of scatter photon energy spectra correlated to particular molecules or substances in order to identify whether the generated spectrum matches any of the library spectra. Based on this comparison, individual molecules or substances, particularly substances for which detection is desired (e.g., explosives, drugs, etc.), may be detected. When a spectrum match is detected, this information may be used to generate an alarm, a display, or take some other action it is appropriate based upon the detected substance.

While the disclosure has been described in terms of specific embodiments, it is evident in view of the foregoing description that numerous alternatives, modifications and variations will be apparent to those skilled in the art. Each of the embodiments described herein may be implemented individually or in combination with any other embodiment unless expressly stated otherwise or clearly incompatible. Accordingly, the disclosure is intended to encompass all such alternatives, modifications and variations which fall within the scope of the disclosure and the following claims.

The invention claimed is:

1. A method for performing X-ray diffraction scanning of an object, comprising:

measuring radiation energy spectra by a 2-D X-ray detector array in which a plurality of individual pixel detectors are configured to count photons within set energy bins; and generating an energy spectrum based on the photon counts received from the plurality of individual pixel detectors;

wherein the plurality of individual pixel detectors include a first row of pixel detectors configured to count photons within a first set of energy bins and a second row of pixel detectors configured to count photons within a second set of energy bins in which the second set of energy bins differ from the first set of energy bins by an inter-row energy difference.

2. The method of claim 1, wherein the second set of energy bins differ from the first set of energy bins by 1 keV.

3. The method of claim 1, wherein second set of energy bins differ from the first set of energy bins by 2 keV.

4. The method of claim 1, wherein second set of energy bins differ from the first set of energy bins by 3 keV.

5. The method of claim 1, wherein second set of energy bins differ from the first set of energy bins by 4 keV.

6. The method of claim 1, further comprising increasing gain of a charge sensitive amplifier within processing circuitry coupled to each of the plurality of individual pixel detectors.

7. The method of claim 1, further comprising individually calibrating each of the plurality of individual pixel detectors.

8. A detector for use in an X-ray diffraction scanner system, comprising a 2-D X-ray detector array in which a plurality of individual pixel detectors are configured to count photons within set energy bins, wherein the plurality of individual pixel detectors include a first row of pixel detectors configured to count photons within a first set of energy bins and a second row of pixel detectors configured to count photons within a second set of energy bins in which the second set of energy bins differ from the first set of energy bins by an inter-row energy difference.

9. The detector of claim 8, wherein the second set of energy bins of the second row of pixel detectors differ from the first set of energy bins of the first row of pixel detectors by 1 keV.

10. The detector of claim 8, wherein the second set of energy bins of the second row of pixel detectors differ from the first set of energy bins of the first row of pixel detectors by 2 keV.

11. The detector of claim 8, wherein the second set of energy bins of the second row of pixel detectors differ from the first set of energy bins of the first row of pixel detectors by 3 keV.

12. The detector of claim 8, wherein the second set of energy bins of the second row of pixel detectors differ from the first set of energy bins of the first row of pixel detectors by 4 keV.

13. The detector claim 8, further comprising a charge sensitive amplifier and a shaping amplifier, where in a gain of the charge sensitive amplifier is increased over a gain suitable for imaging applications.

14. An X-ray diffraction scanning system comprising the detector according to claim 8.

15. The X-ray diffraction scanning system of claim 14, wherein the system is configured to:

measure radiation energy spectra by the 2-D X-ray detector array in which the plurality of individual pixel detectors are configured to count photons within set energy bins; and generate an energy spectrum based on the photon counts received from the plurality of individual pixel detectors.

* * * * *